US007032866B1

(12) United States Patent
Braun et al.

(10) Patent No.: US 7,032,866 B1
(45) Date of Patent: Apr. 25, 2006

(54) BRACKET WITH CAPTURED SPACER

(75) Inventors: Jeffrey J. Braun, Columbus, IN (US); Micheal E. Hopkins, Jr., Indianapolis, IN (US); Sean R. O'Donnell, Columbus, IN (US); Anthony V. Popov, Greenwood, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/438,536

(22) Filed: May 15, 2003

(51) Int. Cl.
*F16L 3/22* (2006.01)

(52) U.S. Cl. ..................... 248/68.1; 248/250; 248/235; 248/231.71; 403/187; 403/188; 403/408.1

(58) Field of Classification Search ............... 248/68.1, 248/250, 235, 231.71, 313, 689, 223.41, 248/220.22, 309.1; 403/187, 188, 408.1, 403/403, 382; 108/42, 152
See application file for complete search history.

(56) References Cited

U.S. PATENT DOCUMENTS 2,303,673 A * 12/1942 Wilson ........................ 248/239
2,319,521 A * 5/1943 Schneider et al. .......... 280/484
3,132,910 A * 5/1964 Vigna ......................... 312/264
3,158,113 A * 11/1964 Johnson ....................... 108/64
4,067,597 A 1/1978 Lawrence
4,165,827 A * 8/1979 Bott ........................... 224/326
4,546,600 A 10/1985 Busboom et al.
4,662,593 A * 5/1987 Shames et al. ........ 248/222.14
4,915,342 A * 4/1990 Nilsson ...................... 248/500
5,090,650 A 2/1992 Donaldson et al.
5,154,385 A * 10/1992 Lindberg et al. ....... 248/225.11
5,201,487 A * 4/1993 Epplett .................... 248/298.1
5,354,025 A * 10/1994 McCaffrey .................. 248/188
5,431,517 A 7/1995 Hoelle et al.
5,535,854 A 7/1996 Prince
5,549,350 A 8/1996 Akiyama et al.
5,699,944 A * 12/1997 Duran ........................ 224/326
5,769,375 A * 6/1998 Welker .................. 248/231.71
6,073,784 A * 6/2000 Hattingh et al. ......... 211/90.01
6,250,596 B1 * 6/2001 Gordin et al. ........... 248/230.1
6,279,860 B1 8/2001 Swanger
6,301,809 B1 10/2001 Staggs, Jr.

* cited by examiner

*Primary Examiner*—Kimberly Wood
(74) *Attorney, Agent, or Firm*—Taylor & Aust, P.C.

(57) ABSTRACT

A support bracket for mounting an engine component to a surface, such as to a cylinder head or engine block. In an embodiment, the support bracket includes a base member, a shelf member and a spacer. The base member has a back portion with a shape that defines a forwardly facing channel. The spacer is shaped to be matably received in the channel, optimizing load distribution between the spacer and the base member. A bolt hole extends through the spacer and is aligned with a bolt hole in the base member. The shelf member is welded to the base member to permanently capture the spacer in the channel. Welding the spacer is unnecessary. The spacer may be made of powdered metal. The spacer provides a free length portion of the capscrew that mounts the bracket against a surface, the free length accommodating longitudinal stress on the capscrew.

9 Claims, 6 Drawing Sheets

BRACKET WITH CAPTURED SPACER

FIELD OF THE INVENTION

This invention generally relates to support brackets for mounting objects and more particularly relates to a support bracket for mounting an engine component.

BACKGROUND OF THE INVENTION

The use of support brackets to mount or hold various components is well known, particularly in the art of engine design. Brackets are used, for example, to mount an engine component to a cylinder head, engine block, or other engine member, without having the component directly contact the engine member.

For example, a conventional bracket includes a base member and a shelf secured to the base member to accommodate an engine component, and a tubular spacer welded to the base member. The base member is mounted to an engine surface with a capscrew. More specifically, the capscrew extends through a hole in a center of the tubular spacer and the base member to mount the conventional bracket against an engine surface.

Problems exist with such a conventional bracket. For example, the weld of the spacer to the base member has been found to fail due to various factors, such as mechanical and thermal stresses, vibration, and highly concentrated loading on a small contact area between the spacer and the base member. A need exists for an improved support bracket.

BRIEF SUMMARY OF THE INVENTION

The present invention provides a support bracket for an engine component, the support bracket including: a base member, a shelf member and a spacer. In an embodiment, the base member has a generally U-shaped back portion shaped to define a channel and a pair of leg portions projecting forwardly from sides of the channel. The channel is shaped to receive the spacer. The shelf member is secured to the legs in a manner such that the shelf member captures the spacer within the channel of the back portion. A bolt hole extends through the spacer and base member to accommodate a bolt or capscrew for mounting the bracket to a structure. The shelf provides a surface to which the engine component can be securely mounted.

The capscrew includes a head on one end of the shaft to hold a front of the spacer, and an opposite end of the shaft fits into threaded bore in the structure on which the bracket is mounted. In an embodiment, the bolt hole through the spacer has a diameter slightly larger than a diameter of a shaft of the capscrew. As a result, an intermediate portion of the shaft is advantageously “free” to permit longitudinal elastic stress of the capscrew.

In an embodiment of the invention, both spacer and the channel of the base member are respectively elongate. For example, the spacer may have a length that about equal to the length of the base member. Such a configuration advantageously optimizes an area of load distribution between the spacer and the base member.

By providing a bracket wherein the spacer is captured within the channel by contact against the shelf member, a need to weld the spacer in position is advantageously eliminated. The elimination of a weld advantageously saves a manufacturing step, thereby reducing costs. Moreover, the elimination of a weld results in a design with improved reliability.

In an embodiment, the spacer is made of powdered metal, which exhibits desirable properties.

According to an embodiment, an advantage of the present invention is that it provides a support bracket that is suitable for use in a high temperature environment. An additional advantage of the present invention is that it provides a support bracket that resists failure under mechanical and thermal stresses.

DETAILED DESCRIPTION OF THE INVENTION

Figure 1:
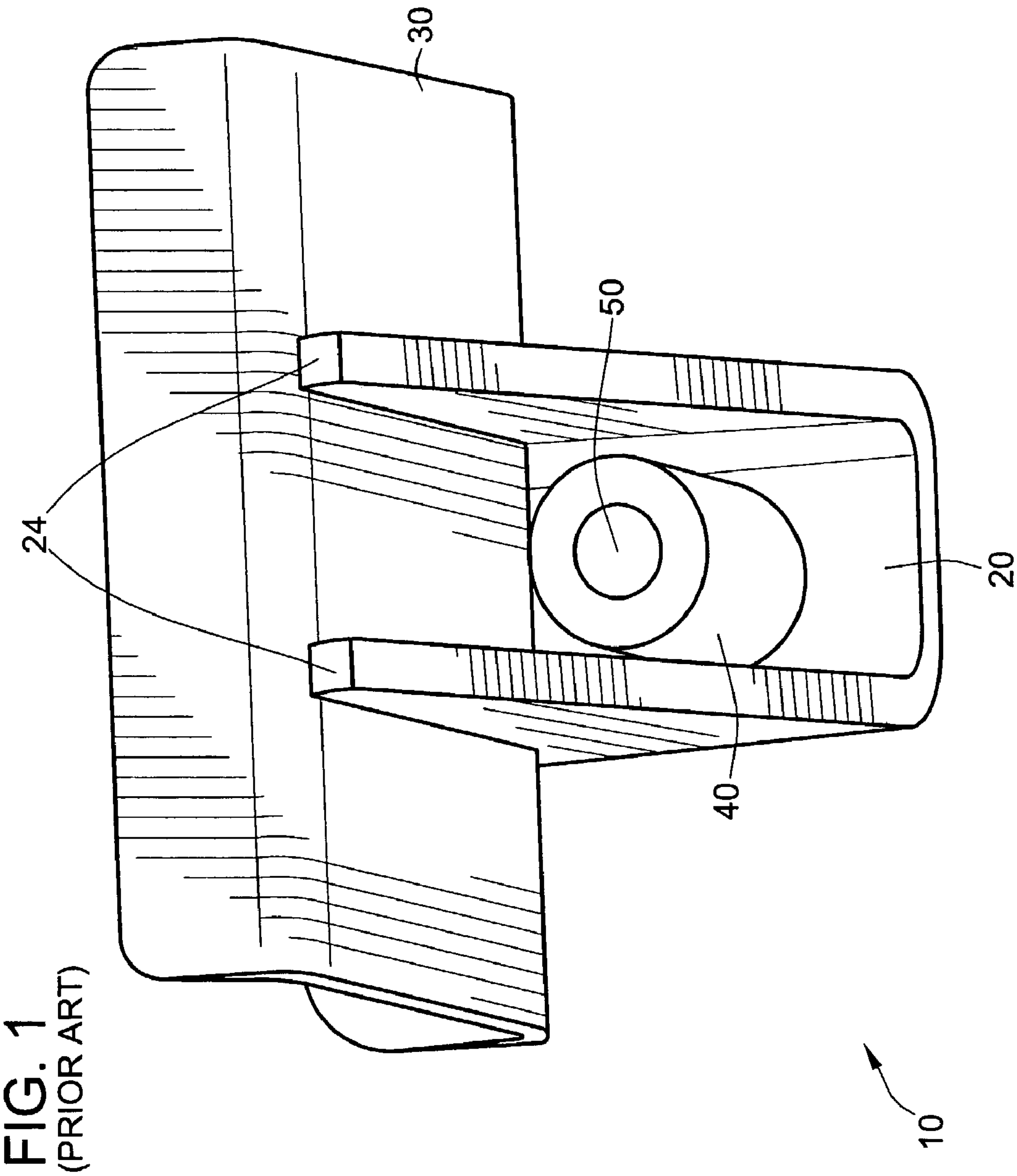
FIG. 1 is a perspective view of a conventional support bracket showing a tubular spacer welded to the back of the bracket.

Now referring to the drawings, wherein like numerals designate like components, FIG. 1 illustrates a conventional support bracket 10. The support bracket 10 includes a base member 20 having a pair of forwardly extending legs 24. A shelf member 30 is mounted to the legs 24 by an appropriate manner of attachment, such as by welding. A tubular spacer 40 is welded to a forward side of the base member 20. A bolt hole 50 is provided through the spacer 40 and base member 20 to accommodate a capscrew (not shown) for mounting the conventional bracket 10.

Figure 2:
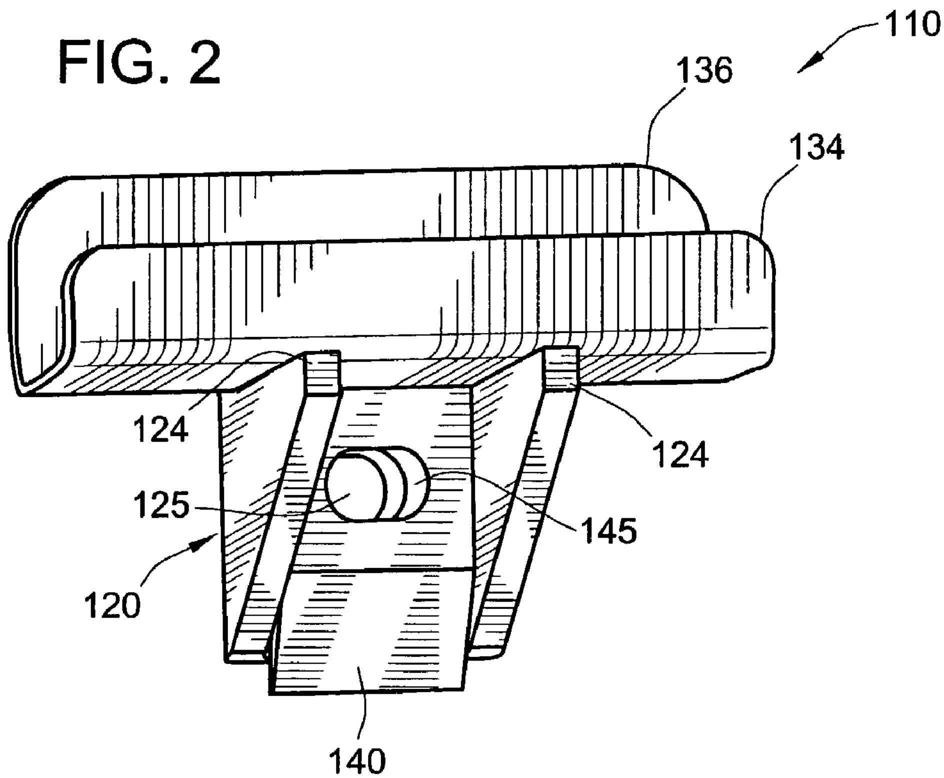
FIG. 2 is a perspective view of an assembled support bracket having features in accordance with the present invention.
Figure 3:
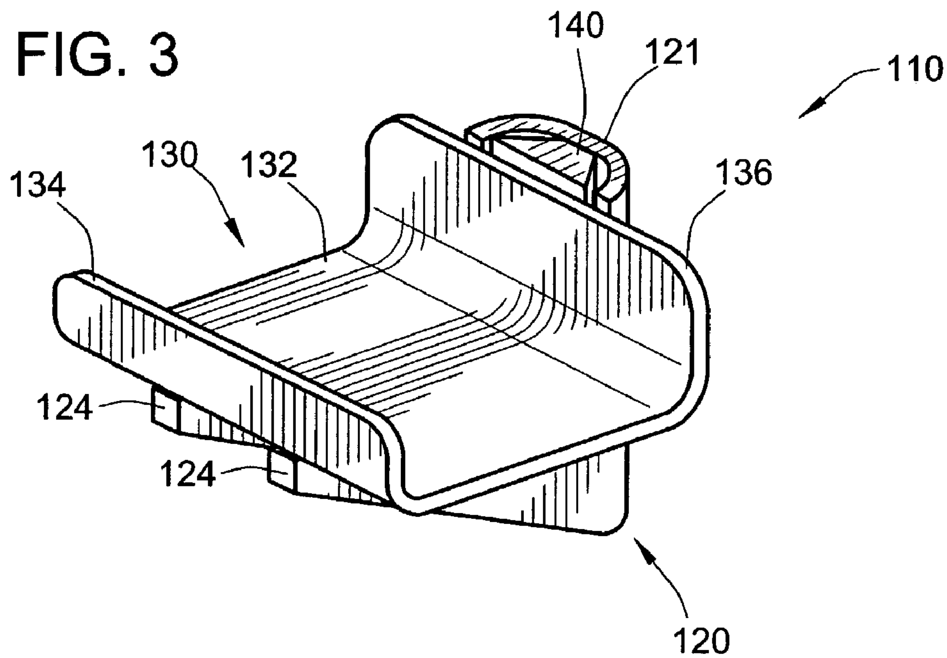
FIG. 3 is a view of the support bracket of FIG. 2 from a different perspective.
Figure 4:
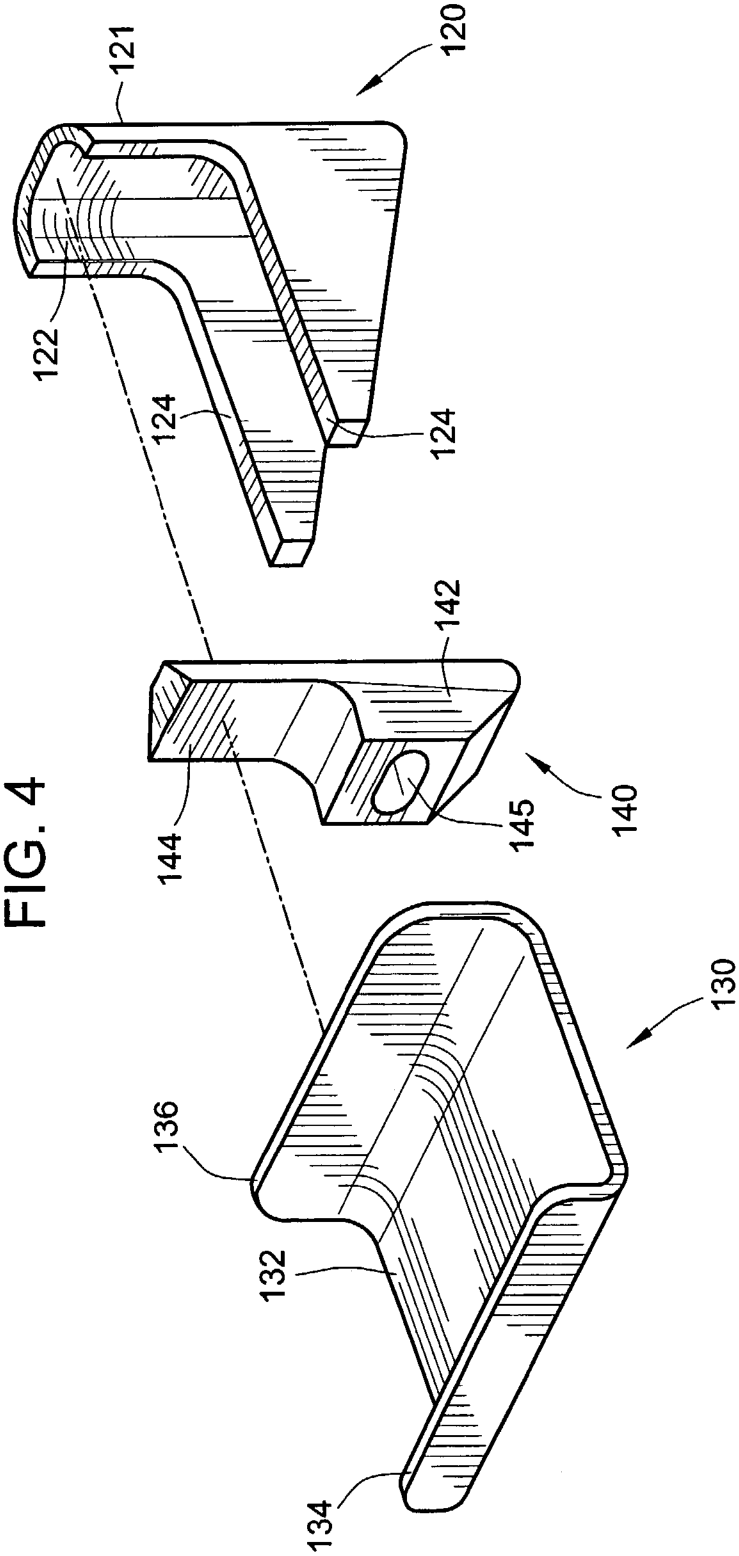
FIG. 4 is an exploded view of the support bracket of FIGS. 2 and 3 showing the base member, shelf member, and the spacer.

FIGS. 2–4 illustrate a support bracket 110 having features in accordance with an exemplary an embodiment of the present invention. The support bracket 110 is intended for use in mounting an engine component 200, as described in greater detail below in connection with FIGS. 7 and 8, however, other possible uses are within the scope of the invention. The support bracket 110 includes a base member 120, a shelf member 130, and a spacer 140.

The base member 120 includes a back portion 121 that has a generally U-shaped cross section to define a channel 122 (FIG. 4). The base member 120 further includes a pair of leg portions 124, each of the leg portions 124 extending forwardly from the back portion 121. A rear side of the back portion 121 is adapted to reside against a mounting surface (not shown) such as a side of a cylinder head or engine block. In the illustrated example, the rear side of the back portion 121 is generally planar.

Still referring to FIGS. 2–4, each of the leg portions 124 has an upper edge shaped to support the shelf member 130. The shelf member 130 is fixed to the leg portions 124, such as by welding, so that the shelf member 130 extends across the leg portions 124. The shelf member 130 captures the spacer 140, as will be described in greater detail below.

According to an aspect of the invention, the spacer has shape configured to distribute a load over an optimal area within a channel of the base member. Additionally, a portion of the spacer is positioned between the shelf member and the base member so that the spacer is captured within the channel. The spacer does not need to be welded, and therefore, load distribution through a weld bead is avoided.

With specific reference to the drawings, to optimally transfer loads through the bracket, the spacer 140 is preferably shaped to be received against the base member 120 within the channel 122. For example, as illustrated in FIGS. 3 and 4, the spacer 140 has a convex rear side defined by multiple planar surfaces that extend generally in a longitudinal direction at angles with respect to each other. It will be understood that such a shape is exemplary, and that the rear side of the spacer 140 could have any other suitable geometric shape, preferably a shape that generally mates with the channel 122.

In an embodiment, base member 120, and the channel 122 therein, has a longitudinal dimension in a vertical direction, and the spacer 140 has longitudinal dimension that is about equal to the longitudinal dimension of the channel. For example, as illustrated in FIGS. 2–6, the spacer 140 has longitudinal dimension that is greater than the longitudinal dimension of the base member 120 and the channel 122. This allows the spacer 140 to generally fill the channel 122, optimizing the contact area and distributing the load between the spacer 140 and the base member 120.

Figure 6:
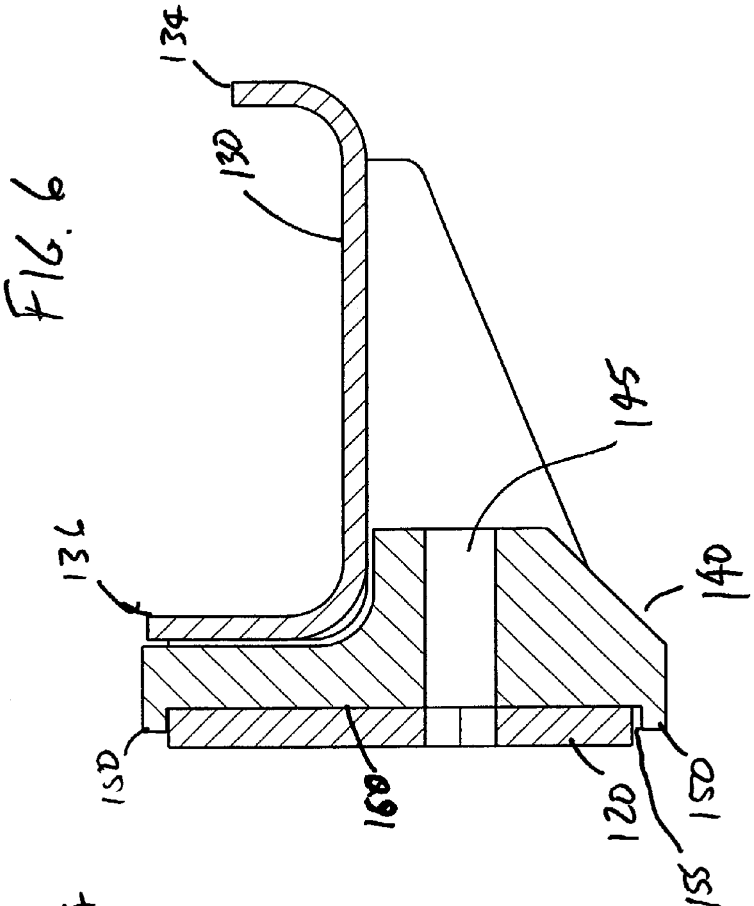
FIG. 6 is a sectional view of the side of the assembled support bracket.
Figure 5:
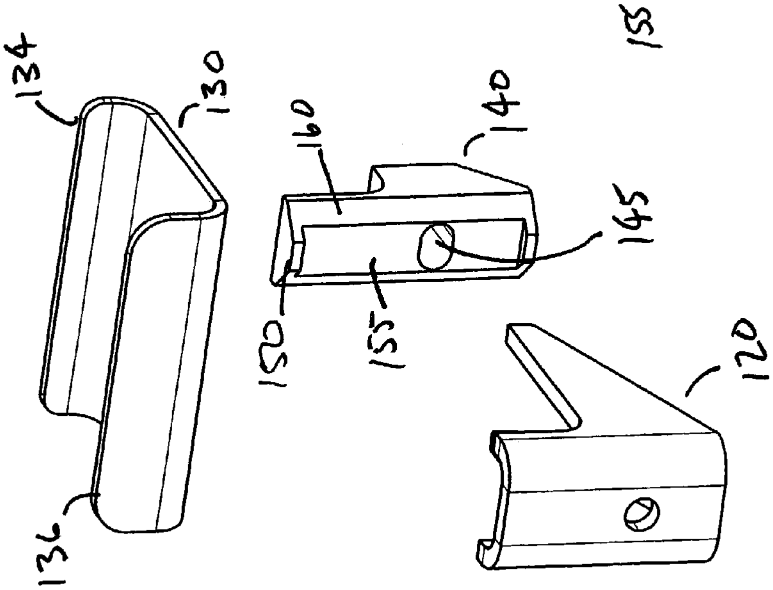
FIG. 5 is an exploded of the support bracket showing retaining hooks on the back side of the spacer and the capscrew aperture in both the base member and the spacer.

The spacer 140 has a back surface 160 that matably resides in the channel 122. In an embodiment, at least one end of the spacer 140 extends beyond the length of the channel 122. In this embodiment, a projection or retaining hook 150 extends from the end of the spacer 140. This projection allows the spacer 140 to hook on to the base member 120, as shown in FIG. 6, thereby allowing the spacer 140 to be retained in the channel 122 without the use of a weld. In an embodiment, as shown in FIGS. 5 and 6, both ends of the spacer 140 extend beyond the length of the channel 122. Each of these ends has a projection 150 extending from the back surface 160, thus allowing the spacer 140 to hook on to both the top and bottom edge of the base member 120. The projection or retaining hook(s) 150 extending from the back surface 160 of the spacer 140 can be formed in any of a number of ways including, but not limited to, the cutting of a recess or channel 155 in the back surface 160 of the spacer 140.

To mount the bracket 110 against a surface, bolt holes are provided. More specifically, a bolt hole 145 (FIGS. 2 and 4) extends through a lower portion 142 of the spacer 140, and a bolt hole 125 (FIG. 2) extends through the back portion 121 of the base member 120. The bolt hole 145 through the spacer 140 and is aligned with the bolt hole 125 through the base member 120 when the spacer 140 is matably received in the channel 122. A capscrew 202 (FIGS. 7 and 8) includes a shaft that is inserted through the bolt holes 125, 145 and is threaded into a bore in the mounting surface. A cross dimension of the bolt holes 125, 145 (FIG. 2) is larger than a diameter of the shaft of the capscrew 202. Such a configuration provides that an intermediate portion of the capscrew that extends through the bracket is free, enabling bolt stretch to withstand thermal expansion.

Figure 7:
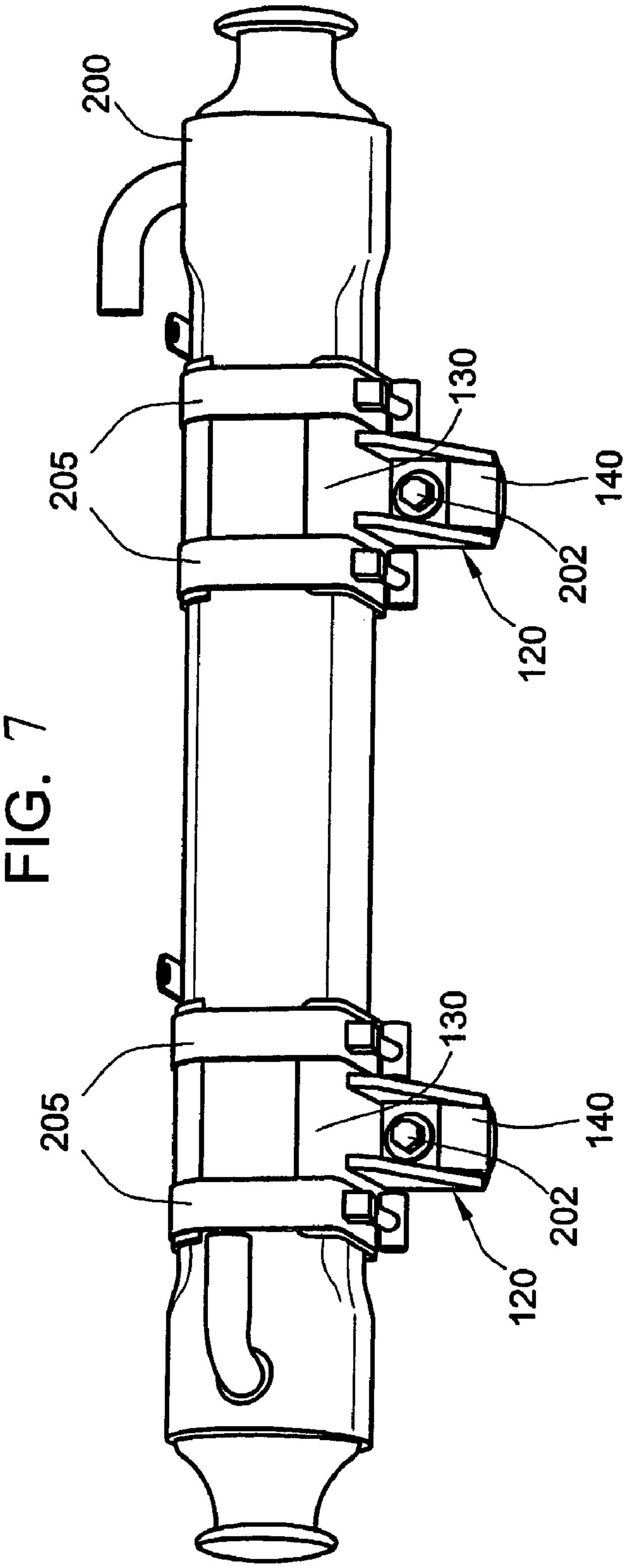
FIG. 7 is a front view of an engine component mounted on two support brackets.
Figure 8:
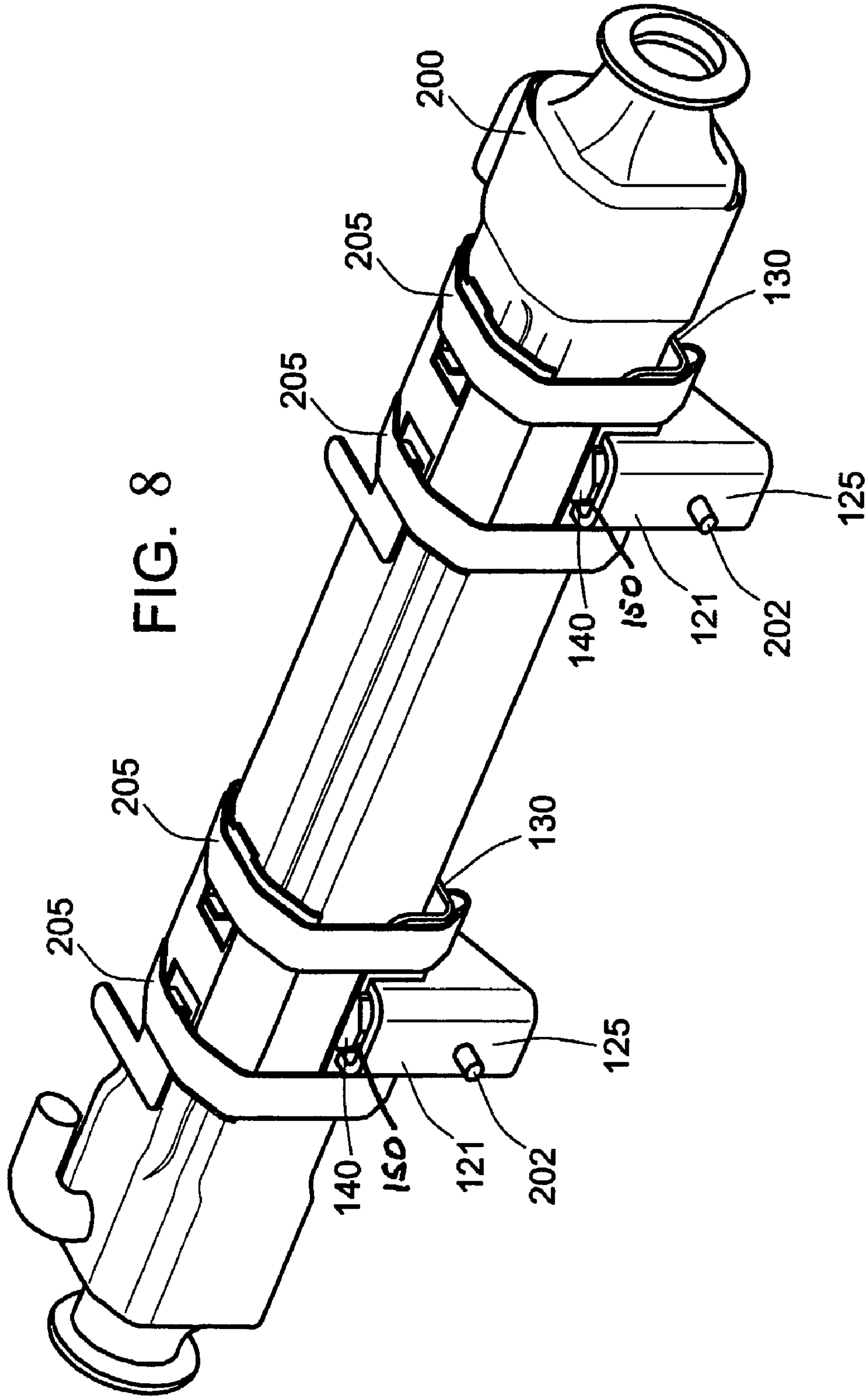
FIG. 8 is a perspective view of the engine component and brackets of FIG. 5, showing a rear side thereof.

The shelf portion 130 has a shape suitable to securely support the engine component 200 (FIGS. 7 and 8). In the illustrated example, referring to FIGS. 2–4, the shelf member 130 generally includes a planar surface 132, a front lip 134 that projects upwardly from a front edge of the planar surface, and a rear lip 136 that projects upwardly from a rear edge of the planar surface.

According to an aspect of an embodiment of the invention, the spacer 140 captured in position against the base member 120 by the shelf member 130. More specifically, an upper portion 144 of the spacer 140 is held in contact between the rear lip 136 of the shelf member 130 and the channel 122 of the base member 130. Because the shelf member 130 is welded to the leg portions 124 spacer 140 is permanently secured. This capture of the spacer 140 by the shelf member 130 eliminates the need to weld the spacer 140 to the base member 120.

In an embodiment, the lower portion 142 of the spacer 140 has a thickness dimension that is greater than a thickness of the upper portion 144. Such a configuration provided greater thickness in the vicinity of the bolt hole 145 to advantageously permit a longer capscrew 202 to be used for optimizing bolt stretch.

The engine component 200 can be mounted to the shelf member 130 in any suitable manner. For example, as shown in FIGS. 7 and 8, the shelf member 130 preferably has a width dimension greater than the distance between the leg portions 124 of the base member, resulting in overhanging portions. The component 200 is then secured to the support bracket by straps or bands 205 that are wrapped around the overhanging portions of the shelf member 130 and around the component 200.

To assemble the support bracket 110, the spacer 140 is inserted in the channel 122 the base member 120. The shelf member 130 is then placed on the upper surface of the leg portions 124 of the base member 120 and against the upper portion 144 of the spacer 140. The shelf member 130 is then welded to the base member 120. The capscrew 202 (FIGS. 7 and 8) inserted into the bolt holes 145 and 125 through the spacer 140 and base member 120, respectively, and tightened to clamp the lower portion 142 of the spacer 140 against the base member 120.

Advantageously, the bracket 110 avoids a need for securing the spacer 140 with weld beads, which are susceptible to failure when exposed to vibration or other loads. Additionally, because the spacer 140 accommodates bolt stretch, capscrew 202 failure due to thermal expansion of the bracket 110 is minimized.

Various materials can be used to manufacture the various components that make up the bracket 110. In particular, powdered metal can be used for the spacer 140.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. While the principles of the invention have been shown and described in connection with but a few embodiments, it is to be understood clearly that such embodiments are exemplary only, and should not be taken as limiting the scope of the invention.

What is claimed is:

1. A support bracket for an engine component, the support bracket comprising:

a base member including a back portion having a shape that defines a forwardly facing channel, the base member configured to mount against a mounting surface, a bolt hole extending through the base member;

a spacer shaped to be matably received in the channel, a bolt hole extending through the spacer and which is aligned with the bolt hole in the base member when the spacer is matably received in the channel; and a shelf member mounted to the base member so that the spacer is permanently captured in the channel between the shelf member and the base member; the base member includes a pair of leg portions extending forwardly from the back portion, the leg portions positioned respectively on opposite sides of the channel, and wherein the shelf member is welded to the leg portions.

2. The support bracket of claim 1, wherein each of the leg portions has an upper surface, and wherein the shelf member extends across both upper surfaces of the leg portions.

3. A support bracket for an engine component, the support bracket comprising:

a base member including a back portion having a shape that defines a forwardly facing channel, the base member configured to mount against a mounting surface, a bolt hole extending through the base member;

a spacer shaped to be matably received in the channel, a bolt hole extending through the spacer and which is aligned with the bolt hole in the base member when the spacer is matably received in the channel;

a shelf member mounted to the base member so that the spacer is permanently captured in the channel between the shelf member and the base member; and a capscrew having a shaft that extends through the bolt holes in the spacer and base member to secure the base member against the mounting surface, each of the bolt holes having a dimension slightly larger than a diameter of the shaft of the capscrew, the spacer includes an upper portion having a first thickness and a lower portion having a second thickness greater than the first thickness, wherein the bolt hole extends through the lower portion of the spacer and wherein the shelf member contacts the upper portion of the spacer.

4. The support bracket of claim 3, wherein the spacer is made of a powdered metal.

5. The support bracket of claim 3, further comprising a plurality of banding straps, the shelf member including a generally planar support surface having first and second edges, said banding straps adjacent to the first and second edges of the support surface thereby securing the engine component to the support surface.

6. A support bracket for an engine component, the support bracket comprising:

a base member including a back portion having a shape that defines a forwardly facing channel, the base member configured to mount against a mounting surface, a bolt hole extending through the base member;

a spacer shaped to be matably received in the channel, a bolt hole extending through the spacer and which is aligned with the bolt hole in the base member when the spacer is matably received in the channel; and a shelf member welded to the base members so that the spacer is permanently captured between the shelf member and the base member, wherein the base member includes a pair of leg portions extending forwardly from the back portion, the leg portions positioned respectively on opposite sides of the channel and wherein the shelf member is welded to the leg portions.

7. The support bracket of claim 6, wherein each of the leg portions has an upper surface, and wherein the shelf member extends across both upper surfaces of the leg portions.

8. A support bracket for an engine component, the support bracket comprising:

a base member including a back portion having a shape that defines a forwardly facing channel, the base member configured to mount against a mounting surface, a bolt hole extending through the base member;

a spacer shaped to be matably received in the channel, a bolt hole extending through the spacer and which is aligned with the bolt hole in the base member when the spacer is matably received in the channel; and a shelf member welded to the base member so that the spacer is permanently captured between the shelf member and the base member;

wherein the spacer includes an upper portion having a first thickness and a lower portion having second thickness greater than the first thickness, wherein the bolt hole extends through the lower portion of the spacer and wherein the shelf member contacts the upper portion of the spacer.

9. The support bracket of claim 8, further comprising a plurality of banding straps, the shelf member including a generally planar support surface having first and second edges, said banding straps adjacent to the first and second edges of the support surface thereby securing the engine component to the support surface.

* * * * *